US010673733B2

(12) United States Patent
Shankar et al.

(10) Patent No.: US 10,673,733 B2
(45) Date of Patent: Jun. 2, 2020

(54) SYSTEM FOR DEBUGGING A NETWORK ENVIRONMENT

(71) Applicant: HCL Technologies Limited, Noida (IN)

(72) Inventors: Venkatesh Shankar, Chennai (IN); Simy Chacko, Chennai (IN)

(73) Assignee: HCL Technologies Limited, Noida, Uttar Pradesh ( * ) Notice: Subject to any disclaimer, the term of this patent is extended or adjusted under 35 U.S.C. 154(b) by 0 days.

(21) Appl. No.: 16/251,109

(22) Filed: Jan. 18, 2019

(65) Prior Publication Data

US 2019/0230021 A1 Jul. 25, 2019

(30) Foreign Application Priority Data

Jan. 20, 2018 (IN) .............................. 201811002419

(51) Int. Cl.
*H04L 12/26* (2006.01)
*H04L 12/851* (2013.01)
*H04L 12/24* (2006.01)

(52) U.S. Cl.
CPC ............ *H04L 43/50* (2013.01); *H04L 41/069* (2013.01); *H04L 41/0695* (2013.01); *H04L 41/142* (2013.01); *H04L 43/0823* (2013.01); *H04L 47/2441* (2013.01)

(58) Field of Classification Search
CPC ............. H04L 41/0695; H04L 43/0823; H04L 41/142; H04L 41/069; H04L 43/50; H04L 47/2441

See application file for complete search history.

(56) References Cited

U.S. PATENT DOCUMENTS

| 5,463,768 | A | 10/1995 | Cuddihy et al. |
| 7,328,376 | B2 | 2/2008 | McGuire et al. |
| 7,379,846 | B1 | 5/2008 | Williams et al. |
| 8,595,553 | B2 | 11/2013 | Goertler et al. |
| 9,189,308 | B2 | 11/2015 | Young et al. |
| 2002/0053045 | A1* | 5/2002 | Gillenwater ........ G06F 11/2273 714/38.14 |
| 2005/0047339 | A1* | 3/2005 | Dube ...................... H04L 1/244 370/230 |
| 2005/0050190 | A1* | 3/2005 | Dube .................. H04L 41/0846 709/223 |

(Continued)

*Primary Examiner* — Abdullahi E Salad
(74) *Attorney, Agent, or Firm* — HM Law Group LLP; Vani Moodley, Esq.

(57) ABSTRACT

Disclosed is a system for debugging the network environment under regression testing. Initially, a data receiving module receives data pertaining to the network environment. An extraction module extracts a plurality of features by using a parser. An identification module identifies an error as a Problem Report (PR) or a False Failure (FF) based on classification of a test case execution log and a similarity confidence. The test case execution log may be classified based on comparison of a predefined pattern with an error pattern of the test case execution log. A generation module may generate second test case based on the plurality of features, a predefined set of instructions and the error pattern associated with the test case execution log by using a K-means and a Nearest Neighbour algorithm. A debugging module debugs the network environment based on execution of a test case.

9 Claims, 4 Drawing Sheets

(56) References Cited

U.S. PATENT DOCUMENTS

| | | | |
|---|---|---|---|
| 2005/0060409 A1* | 3/2005 | Dube | H04L 29/06 709/226 |
| 2008/0133518 A1 | 6/2008 | Kapoor et al. | |
| 2010/0153055 A1* | 6/2010 | Mucha | H04L 43/50 702/122 |

* cited by examiner

SYSTEM FOR DEBUGGING A NETWORK ENVIRONMENT

PRIORITY INFORMATION

The present application claims benefit from Indian Complete Patent Application No. 201811002419 Filed on 20 Jan. 2018 the entirety of which is hereby incorporated by reference.

TECHNICAL FIELD

The present subject matter described herein, in general, relates to debugging a network environment and more particularly to identifying a Problem Report (PR) and a False Failure (FF) in the network environment by using machine learning techniques.

BACKGROUND

Typically, a network/telecom domain may be tested before introducing a new feature to a router or a switch present in the network/telecom domain It is to be noted that the introduction of the new feature may impact adversely to the network/telecom domain by generating one or more errors. In order to rectify the error, the network/telecom domain may undergo at least one of a functional testing and a regression testing for identifying the error.

Generally, the regression testing is performed automatically/manually and followed by a debugging process. In order to do so, multiple events of test suites are created, and one or more automated scripts are attached to the test suites. Each script may contain one or more test cases. Further, upon triggering of the events, manual debugging process for failed test cases is performed. It must be noted that manual debugging process may not be proficient enough to identify each and every error prevailing in the network/telecom domain Further, it is observed that some of the errors get reported even after passing a test case execution. Thus, it is of a paramount concern to identify the errors as such type of errors hinder the productivity. In addition, it becomes cumbersome to identify and troubleshoot such type of errors manually as real errors often get unidentified.

SUMMARY

Before the present systems and methods, are described, it is to be understood that this application is not limited to particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for debugging a network environment and the concepts are further described below in the detailed description. This summary is not intended to identify essential features of the claimed subject matter nor is it intended for use in determining or limiting the scope of the claimed subject matter.

In one implementation, a method for debugging a network environment is disclosed. In order to debug a network environment, initially, data pertaining to a network environment under regression testing may be received upon execution of first test case. Upon receiving the data, a plurality of features may be extracted from the data by using a parser. Subsequent to extracting the plurality of features, an error may be identified as at least one of a Problem Report (PR) and a False Failure (FF) based on classification of a test case execution log, of the first test case, and a similarity confidence. In one aspect, the classification may be based on a comparison of a predefined pattern of a test case execution log with an error pattern of the test case execution log. In another aspect, the test case execution log may indicate a summary pertaining to an execution of the first test case. Further, the PR may indicate occurrence of the error. The FF may indicate incorrect reporting of the error. Upon identifying the error as the PR or the FF, second test case may be generated based on the plurality of features, a predefined set of instructions and the error pattern associated with the test case execution log by using a K-means and a Nearest Neighbour algorithm. Subsequently, the network environment may be debugged based on an execution of the second test case. In another aspect, the aforementioned method for debugging the network environment may be performed by a processor using programmed instructions stored in a memory.

In another implementation, a system for debugging the network environment is disclosed. The system may comprise a processor and a memory coupled to the processor. The processor may execute a plurality of modules present in the memory. The plurality of modules may comprise a data receiving module, an extraction module, an identification module, a generation module and a debugging module. The data receiving module may receive data pertaining to a network environment under regression testing upon execution of first test case. Upon receiving the data, the extraction module may extract a plurality of features from the data by using a parser. Subsequent to extracting the plurality of features, the identification module may identify an error as at least one of a Problem Report (PR) and a False Failure (FF) based on classification of a test case execution log, of the first test case, and a similarity confidence. In one aspect, the identification module may classify the test case execution log based on comparison of a predefined pattern of a test case execution log with an error pattern of the test case execution log. In another aspect, the test case execution log may indicate a summary pertaining to an execution of the first test case. Further, the PR may indicate occurrence of the error. The FF may indicate incorrect reporting of the error. Upon identifying the error as the PR or the FF, the generation module may generate second test case based on the plurality of features, a predefined set of instructions and the error pattern associated with the test case execution log by using a K-means and a Nearest Neighbour algorithm. Subsequently, the debugging module may debug the network environment based on an execution of the second test case.

In yet another implementation, non-transitory computer readable medium embodying a program executable in a computing device for debugging the network environment is disclosed. The program may comprise a program code for receiving data pertaining to a network environment under regression testing upon execution of first test case. The program may further comprise a program code for extracting a plurality of features from the data by using a parser. The program may further comprise a program code for identifying an error as at least one of a Problem Report (PR) and a False Failure (FF) based on classification of a test case execution log, of the first test case, and a similarity confidence. In one aspect, the classification may be based on comparison of a predefined pattern of a test case execution log with an error pattern of the test case execution log. In another aspect, the test case execution log may indicate a summary pertaining to an execution of the first test case. In yet another aspect, the PR may indicate occurrence of the error and the FF may indicate incorrect reporting of the error. The program may further comprise a program code for generating second test case based on the plurality of features, a predefined set of instructions and the error pattern associated with the test case execution log by using a K-means and a Nearest Neighbour algorithm, when the error identified is the PR or the FF. Furthermore, the program may comprise a program code for debugging the network environment based on execution of the second test case.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
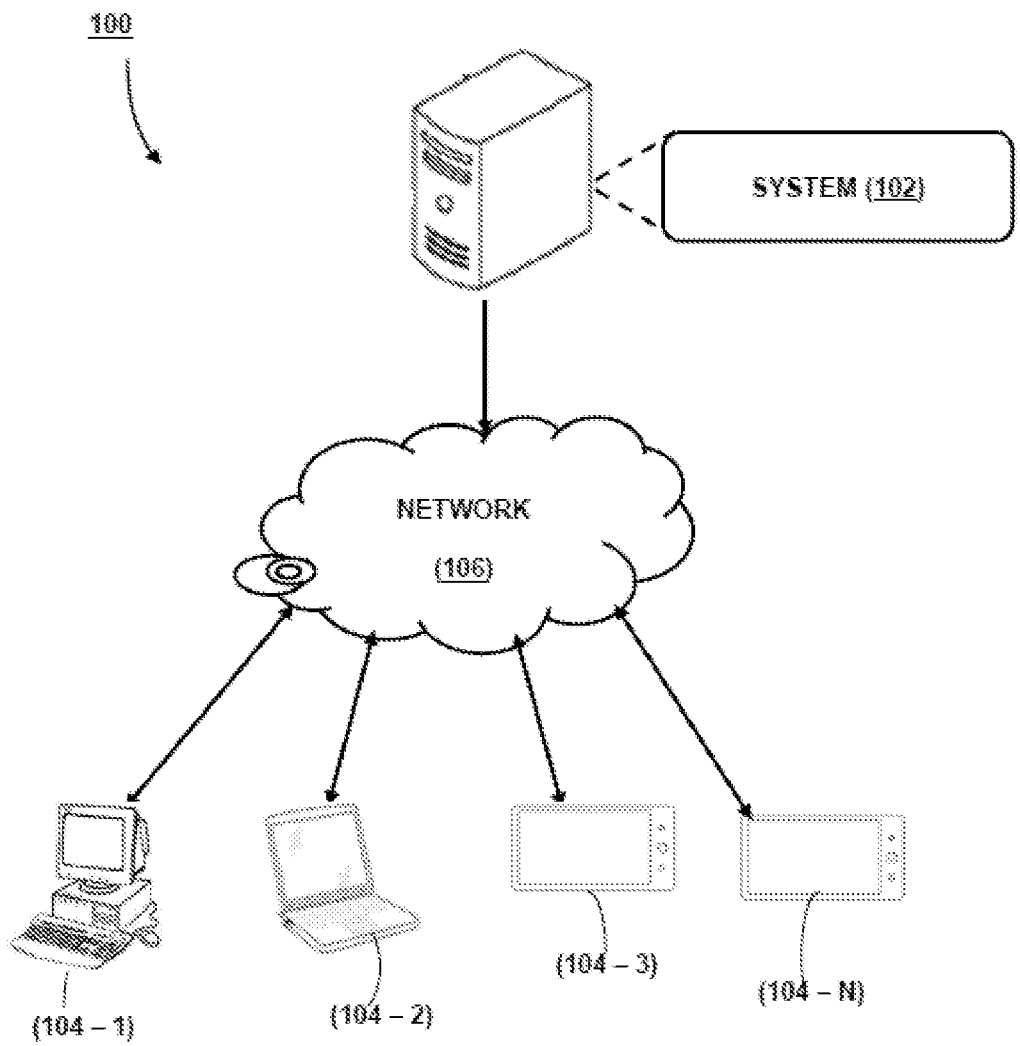
FIG. 1 illustrates a network implementation of a system for debugging a network environment, in accordance with an embodiment of the present subject matter.

Some embodiments of this disclosure, illustrating all its features, will now be discussed in detail. The words "receiving," "extracting," "identifying," "generating," and "debugging," "recommending", "notifying" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods for debugging a network environment are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention introduces a system and a method for debugging a network environment under regression testing. The system utilizes machine learning and feature extraction techniques to identify errors and troubleshoot the network environment. In order to do so, the system receives data from one or more regression databases and file systems comprising test case execution logs. Based on an analysis of the data, one or more features may be extracted. Further, the system analyzes an error pattern associated with the test case execution log. Upon analyzing the error pattern, an error may be identified as at least one of a Problem Report (PR) and a False Failure (FF) with a similarity confidence. It is to be noted that the PR indicates occurrence of the error and the FF indicates incorrect reporting of the error. Upon identification of the error, the system may validate the error by comparing the one or more features with a predefined set of features, present in the repository, corresponding to the test case execution log. In an example, the comparison is based on the similarity confidence associated with each feature. The system then recommends a user or an engineer beforehand in a debugging process with a graphical interface.

In one embodiment, when the error is identified as the FF, the system need not perform debugging of the network environment, however may re-execute a test case. In another embodiment, when the error is identified as PR, the system may perform validation to confirm the error as the PR. Post validation, if the error is recommended as the FF, the system need not perform debugging of the network environment, however may re-execute the test case. On the other hand, after validation, when the error is identified as the PR, the system notifies the user and triggers the debugging of the network environment by using an automated framework.

In order to debug the network environment, the system may refer to a repository comprising a plurality of test cases to rectify the PR or re-execute the test case to rectify the FF. In one implementation, once the system starts building the history, our system may generate the rules or a set of instructions on failure errors automatically with the machine learning techniques and classification and clustering algorithms. The similar or dissimilar test cases may be clustered and codes for rules are created automatically. The weightage and ordering sequence of test case executions may also be set. Subsequent to the generation of the rule, the system may perform automatic debugging of the network environment by using the test case generated. In one implementation, if the error still persists in the network environment, the system may raise a ticket to an external ticketing system for rectifying the error in the automated framework. While aspects of described system and method for debugging the network environment and may be implemented in any number of different computing systems, environments, and/or configurations, the embodiments are described in the context of the following exemplary system.

Referring now to FIG. 1, a network implementation 100 of a system 102 for debugging a network environment is disclosed. In order to debug a network environment, initially, the system 102 may receive data pertaining to a network environment under regression testing upon execution of first test case. Upon receiving the data, the system 102 may extract a plurality of features from the data by using a parser. Subsequent to extracting the plurality of features, the system 102 may identify an error as at least one of a Problem Report (PR) and a False Failure (FF) based on classification of a test case execution log, of the first test case, and a similarity confidence. In one aspect, the system 102 may classify the test case execution log based on comparison of a predefined pattern of a test case execution log with an error pattern of the test case execution log. In another aspect, the test case execution log may indicate a summary pertaining to an execution of the first test case. Further, the PR may indicate occurrence of the error. The FF may indicate incorrect reporting of the error. Upon identifying the error as the PR or the FF, the system 102 may generate second test case based on the plurality of features, a predefined set of instructions and the error pattern associated with the test case execution log by using a K-means and a Nearest Neighbour algorithm. Subsequently, the system 102 may debug the network environment based on an execution of the second test case.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2...104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
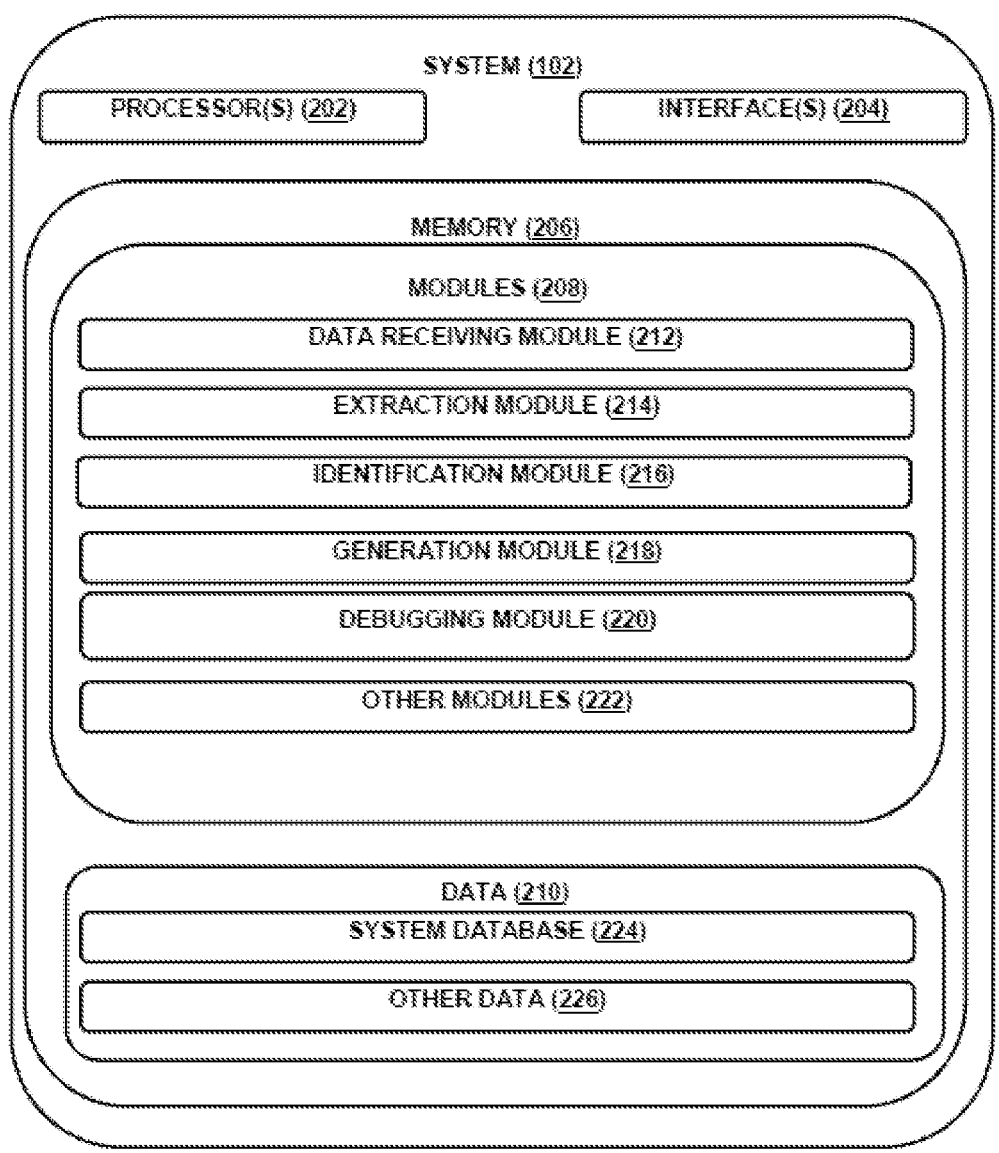
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a data receiving module 212, an extraction module 214, an identification module 216, a generation module 218, a debugging module 220 and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for debugging a network environment. In order to debug a network environment, at first, a user may use the client device 104 to access the system 102 via the I/O interface 204. The user may register them using the I/O interface 204 in order to use the system 102. In one aspect, the user may access the I/O interface 204 of the system 102. The system 102 may employ the data receiving module 212, the extraction module 214, the identification module 216, the generation module 218, and the debugging module 220. The detail functioning of the modules is described below with the help of figures.

The present subject matter discloses a system 102 for debugging a network environment under regression testing. To do so, initially, the data receiving module 212 receives data pertaining to the network environment under regression testing upon execution of first test case. It may be understood that the data receiving module 212 receives the data from at least a user, a database, a cloud server and others. In one implementation, the data may comprise a test case execution log corresponding to the first test case executed in the network environment. It must be noted that the test case execution log indicates a summary pertaining to an execution of the first test case. In another implementation, the test case execution log may comprise a plurality of features detailing key aspects of the network environment. In one example, the plurality of features may comprise information such as router details, param file, param version, topology, library file, library path, perl modules (pm) specific lines, non-perl modules (non-pm) specific lines, interface details, and alike. In one example, critical data may be identified with the help of a checklist stored in the system database 224.

Further to receiving the data, the extraction module 214 extracts the plurality of features by using a parser. In one implementation, the extraction module 214 facilitates cleaning of the data by using Natural Language Processing (NLP) techniques, when the data is received from a file system comprising multiple test execution logs. In another implementation, extraction module 214 may extract the plurality of features by parsing through a regression test database. In addition, the extraction module 214 facilitates storing of the plurality of features and their corresponding value in the system database 224.

Subsequent to extracting the plurality of features, the identification module 216 may identify an error as at least one of a Problem Report (PR) and a False Failure (FF) based on classification of the test case execution log, of the first test case, and a similarity confidence. It may be noted that the similarity confidence is associated with each feature of the plurality of features. Further, the similarity confidence indicates a percentage value derived from the plurality of features or pattern matching with respect to the PR or the FF. Furthermore, the similarity confidence facilitates to derive the PR or the FF based on the test case execution logs recorded in the history. Furthermore, the test case execution log may be classified based on a comparison of a predefined pattern of a test case execution log with an error pattern of the test case execution log. It must be noted that the predefined pattern of a test case execution log indicates summary of one or more test cases executed on a component present in the network environment. Example of the component may include, but not limited to, a router, a modem, a server, a computer, a mobile, an Ethernet hub, a set of beacon, and telecommunication devices. Thus, when the error is reported at one or more components present in the network environment, the test execution log is analyzed to identify and troubleshoot the error.

In one implementation, the identification module 216 facilitates analysis of the test case execution log by performing pattern matching with the predefined pattern of the test case execution log based on the machine learning techniques. Upon analysis, the identification module 216 identifies the error pattern associated with the test case execution log. Based upon the error pattern identified, the identification module 216 identifies the error as at least one of the PR and the FF. It is to be noted that the PR indicates occurrence of the error Similarly, the FF is indicative of an incorrect reporting of the error. In addition, it must to be noted that the test execution logs for both the PR and the FF are stored along with the similarity confidence associated with each feature of the test execution logs in the system database 224.

In one embodiment, when the error identified is the FF, the system 102 notifies the user about the error and updates the system database 224. In another embodiment, when the error identified is the PR, the system 102 may trigger the identification module 216 to validate the error as the PR based on a comparison of the plurality of features with a predefined set of features corresponding to the first test case. It is to be noted that the comparison is based on the similarity confidence associated with each feature.

Further to identifying the error, the system 102 may select second test case from the system database 224 for rectifying the error identified. In one implementation, when the second test case pertaining to the error is not present in the system database 224, the generating module 218 generates the second test case based on the plurality of features extracted, a predefined set of instructions and the error pattern of the test case execution log. It is to be noted that the predefined set of instructions may be defined in the system 102 by a user or an engineer. In addition, the generating module 218 generates the second test case by using a K-means and a Nearest Neighbour algorithm. In one implementation, the generating module 224 generates the second test case based on inputs received including, but not limited to, error stacks, log contents, plurality of features, and historical data.

After generating the second test case, the debugging module 220 debugs the network environment based on an execution of the second test case. It is to be noted that debugging (hereinafter may also be referred as 'troubleshooting') may be completely automated based on the test execution logs and recommendation of the error by using the machine learning algorithms and clustering techniques. The debugging module 220 facilitates rectification of the error in each component of the network environment. Further to rectifying the error, the debugging module 220 may notify the user about the rectification of the error. In one implementation, when the error is not rectified by the debugging module 220, the system 102 may capture a failure information stack comprising the test case execution log and a location information associated with the router. Further, the system 102 connects an external ticketing system, with the failure information stack, to rectify the error. If the error is rectified, the user may be notified by the system 102.

Figure 3:
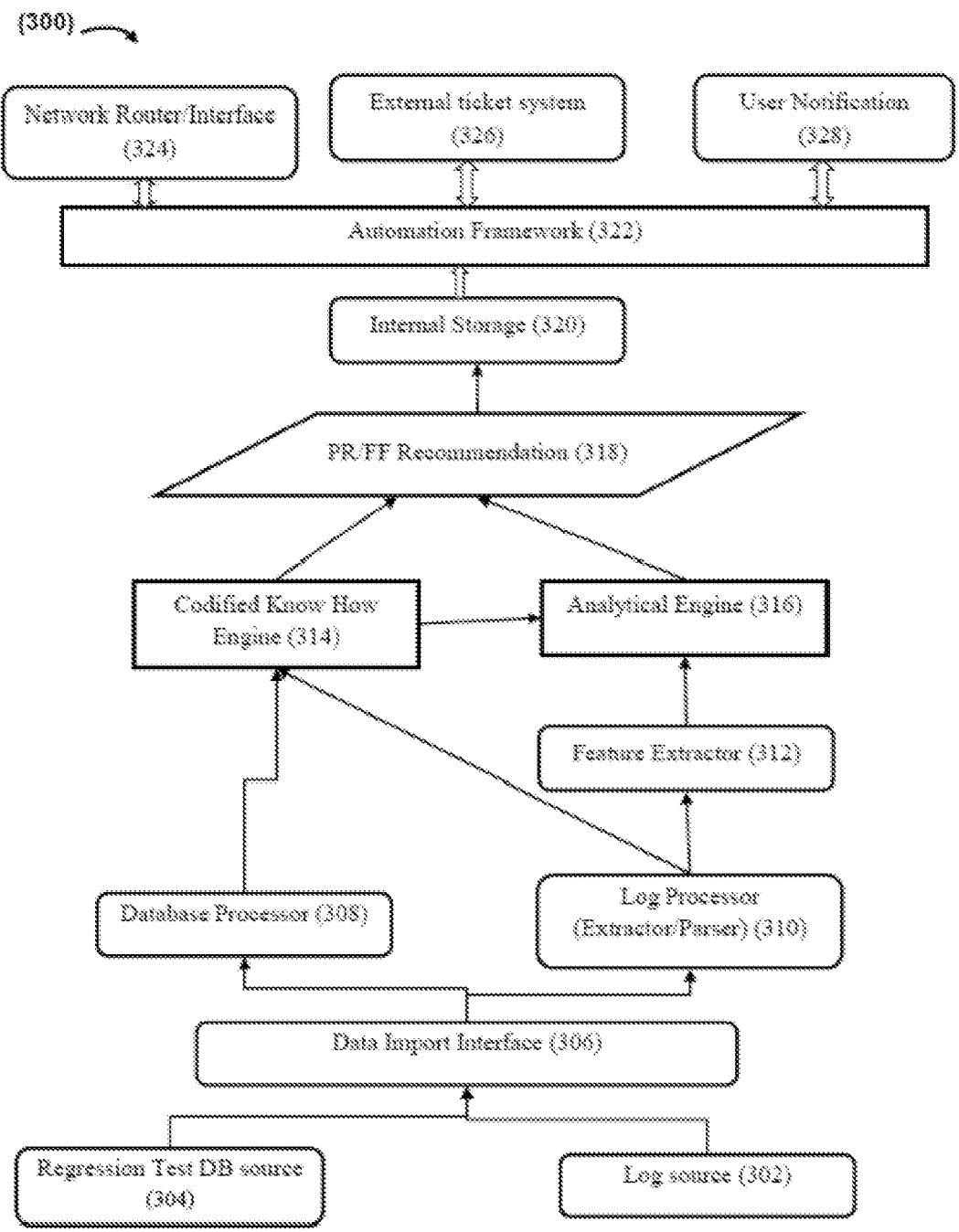
FIG. 3 illustrates a workflow of the system for debugging a network environment, in accordance with an embodiment of the present subject matter.

In order to elucidate further, now consider FIG. 3, a workflow 300 of the system 102 for debugging a network environment is shown, in accordance with an embodiment of the present subject matter. In order to debug the network environment, initially, data may be received from at least one of a regression test database source 304 and a log source 302. The regression test database source 304 comprises one or more test case execution logs pertaining to each component present in the network environment. It may be noted that the regression test database source 304 may be wirelessly connected to the system 102. The log source 302 comprises a file system comprising one or more test case execution logs. In one implementation, the data may be received by a data import interface 306. The data import interface 306 is configured to gather the data from different sources such as the regression database 304 or the log source 302. The data import interface 306 acts as an Extract Transform Load (ETL) processor in the system 102.

Once the data is imported in the system 102, a database processor 308 may process the information available at the data import interface 306. In one implementation, information present at the data import interface 306 may be exported to a log processor 310. The log processor may be configured to extract test case execution logs, from the file system, corresponding to the component. The log processor 310 may utilize the machine learning techniques for extracting the test case execution logs. In another implementation, the log processor 310 may be configured to parse the data from different data fields of the data import interface 306.

After extracting the logs and parsing the data, the system 102 utilizes a codified know-how engine 314 to identify an error in the network environment. The codified know-how engine 314 receives input from the data processor 308 and the log processor 310. The input may comprise an error stack, test case execution logs, historical data and others. The codified know-how engine 314 analyzes an error pattern of the test execution logs and the historical data, related to the component undergoing regression testing, by using a K-means and a Nearest Neighbor algorithm. The codified know-how engine 314 may be configured to analyze the error pattern of the test execution logs based on a predefined set of rules defined by a user to identify the error as at least one of a Problem Report (PR) and a False failure (FF). In addition, the codified know-how engine 314 is further configured to automatically generate a new rule based on the historical data and the test case execution logs.

Once the error is identified, an analytical engine 316 may process the test case execution log comprising the error to recommend the error type as the PR or the FF. In other words, the analytical engine 316 is triggered when the codified know how engine 314 reports the error. In addition, the analytical engine 316 is further configured to validate the error as the PR or the FF. In order to validate the error type, the analytical engine 316 utilizes a feature extractor 312 for extracting a plurality of features from the test case execution logs. The feature extractor 312 is configured to extract the plurality of features by using Natural Language Processing (NLP) techniques. Upon extracting the features, the analytical engine 316 may identify a list of executions not processed by the codified know how engine 314. The analytical engine 312 then compares each and every test execution with historical data to determine the PR or the FF confidence with similarity of failures list.

Subsequently, PR/FF recommendation 318 may update an internal storage 320 with the error type identified by the codified know how engine 314 and the analytical engine 316. In one example, the codified know how engine 314 may identify an error as the PR and the analytical engine 316 may not identify the error, thus the PR/FF recommendation 318 may notify the error as the FF and the user need not be notified. In another example, when both the codified know how engine 314 and the analytical engine 316 identifies the error as the PR, an automation framework 322 may be triggered to troubleshoot the error.

The automation framework 322 generates a new test case or a set of rules to debug the network environment. The automation framework 322 may generate the new test case or the set of rules based on historical data, the error pattern of the test case execution logs, and a predefined set of instructions stored at the internal storage. It is to be noted that the automation framework 322 is configured to debug the network environment by using the machine learning techniques and without any human intervention. In one implementation, when the error is still not rectified, the automation framework 322 may connect an external ticket system 326 to raise a ticket for the error. The external ticket system 326 may further refer to other network router/interface 324, connected through the automation framework 322, for rectifying the error. Once the error is rectified, the user notification 328 may notify the user or the engineer though an email, message, push notification and others.

Figure 4:
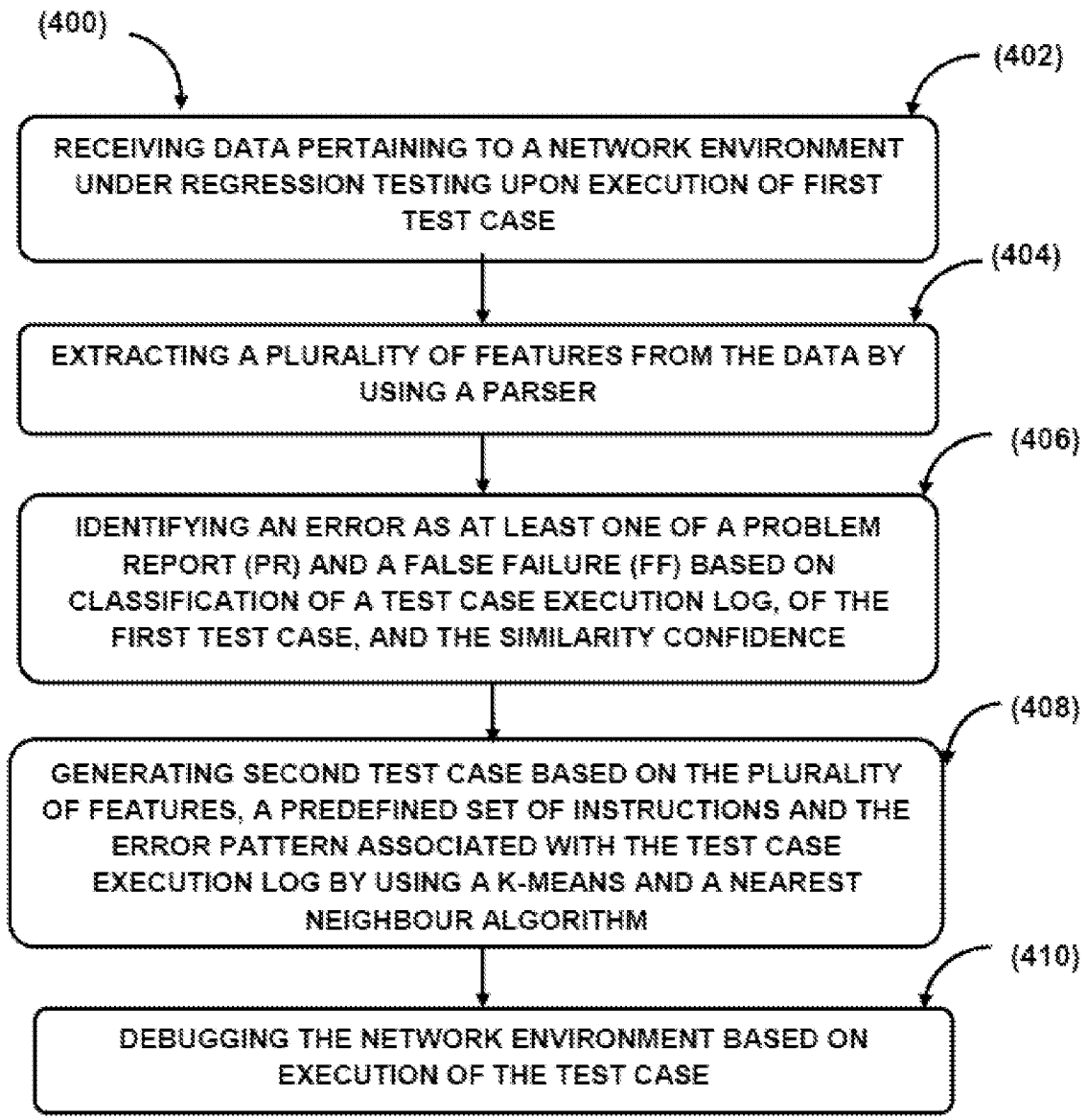
FIG. 4 illustrates a method for debugging a network environment, in accordance with an embodiment of the present subject matter.

Referring now to FIG. 4, a method 400 for debugging a network environment is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, data pertaining to a network environment under regression testing may be received upon execution of first test case. In one implementation, data pertaining to a network environment under regression testing upon execution of first test case may be received by a data receiving module 212.

At block 404, a plurality of features may be extracted from the data by using a parser. In one implementation, a plurality of features from the data by using a parser may be extracted by an extraction module 214.

At block 406, an error may be identified as at least one of a Problem Report (PR) and a False Failure (FF) based on classification of a test case execution log, of the first test case, and a similarity confidence. In one implementation, an error as at least one of a Problem Report (PR) and a False Failure (FF) may be identified by an identification module 216.

At block 408, second test case may be generated based on the plurality of features, a predefined set of instructions and the error pattern associated with the test case execution log by using a K-means and a Nearest Neighbour algorithm, when the error identified is the PR. In one implementation, the second test case may be generated by a generation module 218.

At block, 410, the network environment may be debugged based on execution of the test case. In one implementation, the network environment may be debugged based on execution of the test case by a debugging module 220.

Exemplary embodiments discussed above may provide certain advantages. Though not required to practice aspects of the disclosure, these advantages may include those provided by the following features.

Some embodiments enable a system and a method to provide ease in identification of false failures/false positive errors.

Some embodiments enable a system and a method to eliminate risks associated with a Debug Regression (DR) environment.

Some embodiments enable a system and a method to avoid duplicate Problem Report/log genuine Problem Report.

Some embodiments enable a system and a method to eliminate issues during manual debugging.

Some embodiments enable a system and a method to automate detection and troubleshooting of errors in a network environment under regression testing.

Although implementations for methods and systems for debugging a network environment have been described in language specific to structural features and/or methods, it is to be understood that the appended claims are not necessarily limited to the specific features or methods described. Rather, the specific features and methods are disclosed as examples of implementations for debugging a network environment.

The invention claimed is:

1. A method for debugging a network environment, the method comprising:

receiving, by a processor, data pertaining to a network environment under regression testing upon execution of first test case;

extracting, by the processor, a plurality of features from the data by using a parser;

identifying, by the processor, an error as at least one of a Problem Report (PR) and a False Failure (FF) based on classification of a test case execution log, of the first test case, and a similarity confidence, wherein the classification is based on comparison of a predefined pattern of a test case execution log with an error pattern of the test case execution log, and wherein the test case execution log indicates a summary pertaining to an execution of the first test case, and wherein the PR indicates occurrence of the error, and wherein the FF indicates incorrect reporting of the error;

generating, by the processor, second test case based on the plurality of features, a predefined set of instructions and the error pattern associated with the test case execution log by using a K-means and a Nearest Neighbour algorithm, when the error identified is the PR;

and debugging, by the processor, the network environment based on execution of the second test case.

2. The method of claim 1 further comprises recommending the error as the PR based on a comparison of the plurality of features with a predefined set of features corresponding to the first test case, wherein the comparison is based on the similarity confidence associated with each feature.

3. The method of claim 1 further comprises notifying a user, when the error is rectified from the network environment, and when the error is identified as the FF.

4. The method of claim 1, wherein the plurality of features includes information such as router details, param file, param version, topology, library file/path, pm specific lines, non- pm specific lines, and interface details.

5. A system for debugging a network environment, the system (102) comprising:
 a processor; and
 a memory coupled to the processor, wherein the processor is capable of executing a plurality of modules stored in the memory, and wherein the plurality of modules comprising:
  a data receiving module for receiving data pertaining to a network environment under regression testing upon execution of first test case;
  an extraction module for extracting a plurality of features from the data by using a parser;
  an identification module for identifying an error as at least one of a Problem Report (PR) and a False Failure (FF) based on classification of a test case execution log, of the first test case, and a similarity confidence, wherein the classification is based on comparison of a predefined pattern of a test case execution log with an error pattern of the test case execution log, and wherein the test case execution log indicates a summary pertaining to an execution of the first test case, and wherein the PR indicates occurrence of the error, and wherein the FF indicates incorrect reporting of the error;
  a generation module for generating second test case based on the plurality of features, a predefined set of instructions and the error pattern associated with the test case execution log by using a K-means and a Nearest Neighbour algorithm, when the error identified is the PR; and
  a debugging module for debugging the network environment based on execution of the second test case.

6. The system of claim 5 is further configured to recommend the error as the PR based on a comparison of the plurality of features with a predefined set of features corresponding to the first test case, wherein the comparison is based on the similarity confidence associated with each feature.

7. The system of claim 5 is further configured to notify a user,
 when the error is rectified from the network environment, and
 when the error is identified as the FF.

8. The system of claim 5, wherein the plurality of features includes information such as router details, param file, param version, topology, library file/path, pm specific lines, non-pm specific lines, and interface details.

9. A non-transitory computer readable medium embodying a program executable in a computing device for debugging a network environment, the program comprising a program code:
 a program code for receiving data pertaining to a network environment under regression testing upon execution of first test case;
 a program code for extracting a plurality of features from the data by using a parser;
 a program code for identifying an error as at least one of a Problem Report (PR) and a False Failure (FF) based on classification of a test case execution log, of the first test case, and a similarity confidence, wherein the classification is based on comparison of a predefined pattern of a test case execution log with an error pattern of the test case execution log, and wherein the test case execution log indicates a summary pertaining to an execution of the first test case, and wherein the PR indicates occurrence of the error, and wherein the FF indicates incorrect reporting of the error;
 a program code for generating second test case based on the plurality of features, a predefined set of instructions and the error pattern associated with the test case execution log by using a K-means and a Nearest Neighbour algorithm, when the error identified is the PR; and
 a program code for debugging the network environment based on execution of the second test case.

* * * * *